United States Patent
Kawashima

[11] Patent Number: 5,884,598
[45] Date of Patent: Mar. 23, 1999

[54] DIESEL ENGINE INTAKE PORT

[75] Inventor: Junichi Kawashima, Yokosuka, Japan

[73] Assignee: Nissan Motor Co., Ltd., Kanagawa, Japan

[21] Appl. No.: 928,333

[22] Filed: Sep. 12, 1997

[30] Foreign Application Priority Data

Sep. 17, 1996 [JP] Japan .................................. 8-244982

[51] Int. Cl.⁶ ........................................................ F01L 3/00
[52] U.S. Cl. ........................................ 123/188.8; 123/306
[58] Field of Search ................................ 123/306, 188.18

[56] References Cited

U.S. PATENT DOCUMENTS

| | | | |
|---|---|---|---|
| 3,274,981 | 9/1966 | Peras | 123/306 |
| 3,874,357 | 4/1975 | List et al. | 123/306 |
| 3,945,363 | 3/1976 | Elsbett et al. | 123/306 |
| 4,308,832 | 1/1982 | Okumura et al. | 123/188.14 |
| 4,366,787 | 1/1983 | Gale | 123/188.8 |
| 4,574,751 | 3/1986 | Sugiyama et al. | 123/306 |
| 4,745,890 | 5/1988 | Wyczalek et al. | 123/306 |
| 5,713,329 | 2/1998 | Absenger | 123/306 |

FOREIGN PATENT DOCUMENTS 59-12123  1/1984  Japan .

*Primary Examiner*—David A. Okonsky
*Attorney, Agent, or Firm*—McDermott, Will & Emery

[57] ABSTRACT

An intake port of a diesel engine comprises a straight part, a winding part and a cylindrical part. A connecting port connecting the winding part with the cylindrical part is formed at a height H from the roof of the combustion chamber. $H = R_t \cdot \alpha \cdot \tan \theta$, where $R_t$=radius of cylindrical part, $\alpha$=angle subtended by the flowrate gravity center position and optimum inflow position of the connecting port at the center of the cylindrical part, $\theta$=aspirated air descending angle in winding part. Due to this height setting, both swirl intensification and volume efficiency improvement are achieved.

3 Claims, 7 Drawing Sheets

DIESEL ENGINE INTAKE PORT

FIELD OF THE INVENTION

This invention relates to the shape of a helical type intake port for a diesel engine.

BACKGROUND OF THE INVENTION

In a direct injection diesel engine wherein fuel is directly injected into a cylinder, it is necessary to promote mixing of the injected fuel and aspirated air in order to enhance the combustibility of the fuel. To satisfy this need, a helical port may for example be used so that the aspirated air sets up a swirl inside the cylinder.

This helical port comprises a straight part, a cylindrical part which opens into a combustion chamber and a winding part bent into a spiral which connects the cylindrical part and straight part.

This helical port is disclosed for example in Tokkai Sho 59-12123 published by the Japanese Patent Office in 1984. According to this prior art, swirl is enhanced and volume efficiency improved by modifying the plan form of the winding part.

However, even when the plan form of the winding part was suitably set, the intensity of the swirl set up in the cylinder is different according to the height of the winding part and it was not necessarily possible to achieve the dual objectives of swirl enhancement and volume efficiency improvement.

SUMMARY OF THE INVENTION

It is therefore an object of this invention to precisely specify the shape of a helical port which has advantages in view of both swirl enhancement and volume efficiency improvement.

In order to achieve the above object, this invention provides a specific helical intake port through which air flows into a combustion chamber of a diesel engine.

This helical intake port comprises a cylindrical part having an opening at an upper end of the combustion chamber, a winding part bent into a spiral shape connected to the cylindrical part via a connecting port formed in an upper end of the cylindrical part, and a straight part connected to an upstream end of the winding part for guiding air to the winding part in a linear stream, wherein a height H from the opening to the connecting port is determined by the following equation:

$$H = Rt \cdot \alpha \cdot \tan \theta$$

where,

Rt=radius of cylindrical part,

α=angle subtended by flowrate gravity center position and optimum inflow position of connecting port at center of cylindrical part, and θ=descending angle of aspirated air in winding part.

It is preferable that the angle α is set equal to an angle between a line taken at an angle C·γ in a swirl direction relative to a line connecting a start point of the connecting port and the center of the cylindrical part, and a line connecting the center of the cylindrical part and the center of a cylinder, the angle γ is set equal to a spread angle relating to a length of the connecting port, and C is set in the range: $0.25 \leq C \leq 0.45$.

It is also preferable that a descending angle of a roof plane of the winding part is made to effectively coincide with a descending angle θ of the aspirated air obtained by the following equation:

$$\theta = \cos^{-1}\left(\frac{Sr \cdot A}{St \cdot B}\right)$$

where,

Sr=target swirl ratio,

A=cross-sectional area of part connecting the straight part and winding part,

St=stroke distance of piston which expands and compresses combustion chamber, and B=diameter of cylinder.

The details as well as other features and advantages of this invention are set forth in the remainder of the specification and are shown in the accompanying drawings

DESCRIPTION OF THE PREFERRED EMBODIMENTS

Figures 1A, 1B:
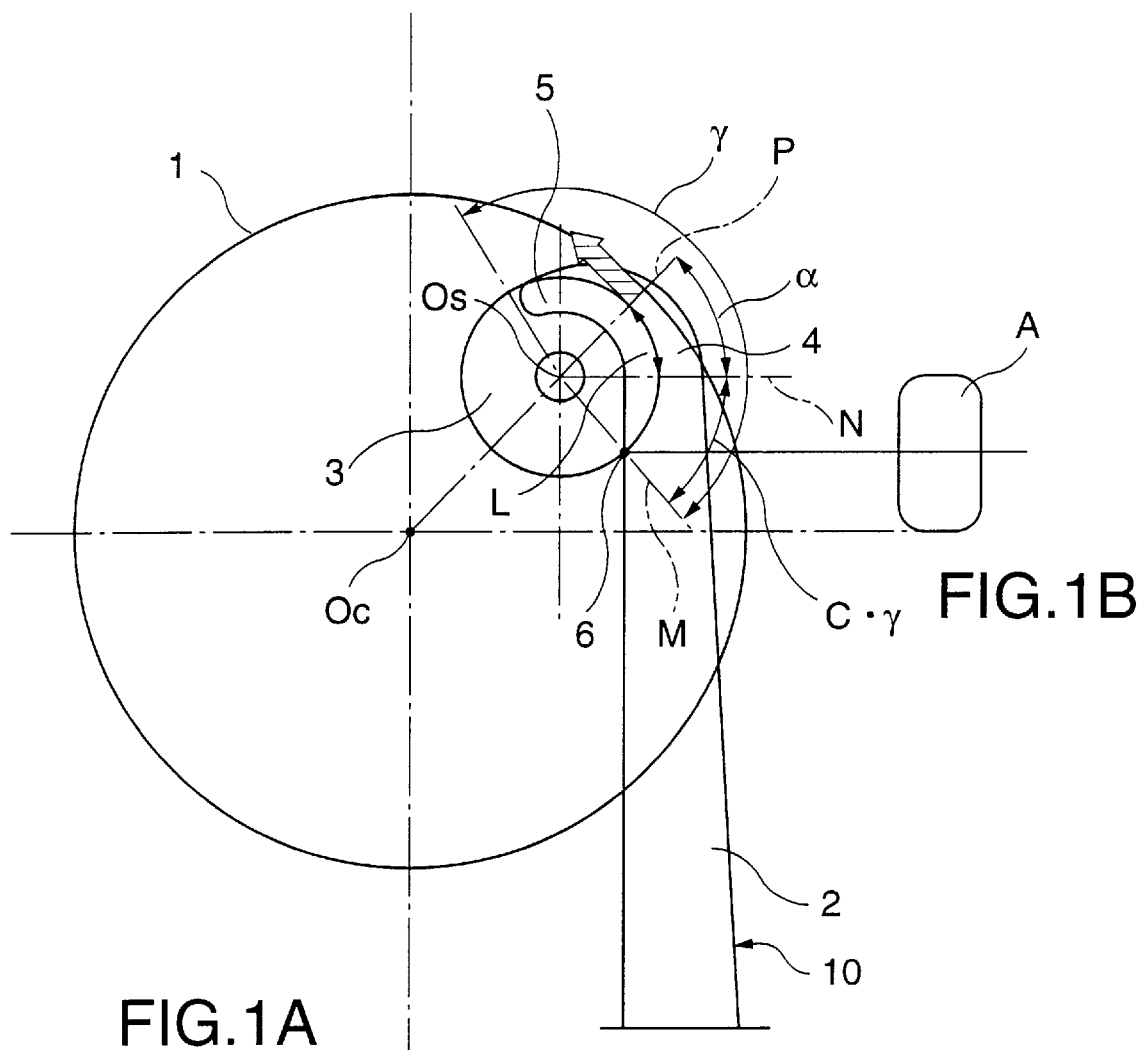
FIGS. 1A and 1B are a plan view of a helical intake port and a cross-sectional view of a connecting part, according to this invention.

Referring to FIG. 1 of the drawings, a cylinder 1 of a diesel engine aspirates air via a helical intake port 10.

A directional intake port and two exhaust ports, not shown, are aligned with the helical intake port 10 in the cylinder 1.

A fuel injector not shown, faces the middle part of the cylinder 1. Fuel injected into the cylinder 1 by the fuel injector mixes with air aspirated from the helical intake port 10 and directional intake ports and compressed by a piston which slides in the cylinder 1. The fuel injected into the compressed air is then burnt by compression ignition.

The helical intake port 10 and directional intake ports both open on the right of a vertical center line in the figure. The helical intake port 10 overhangs the directional intake ports, so the helical intake port 10 is longer than the directional intake ports.

The helical intake port 10 comprises a straight part 2, winding part 4 and cylindrical part 3.

The upstream end of the straight part 2 opens into one side of a cylinder head of the engine, the cross-sectional area of the straight part 2 progressively decreasing from upstream to downstream.

The winding part 4 has a spiral plan form which winds from the straight part 2 to the cylindrical part 3 so as to generate a swirl in a horizontal direction in the cylinder 1.

Figure 2:
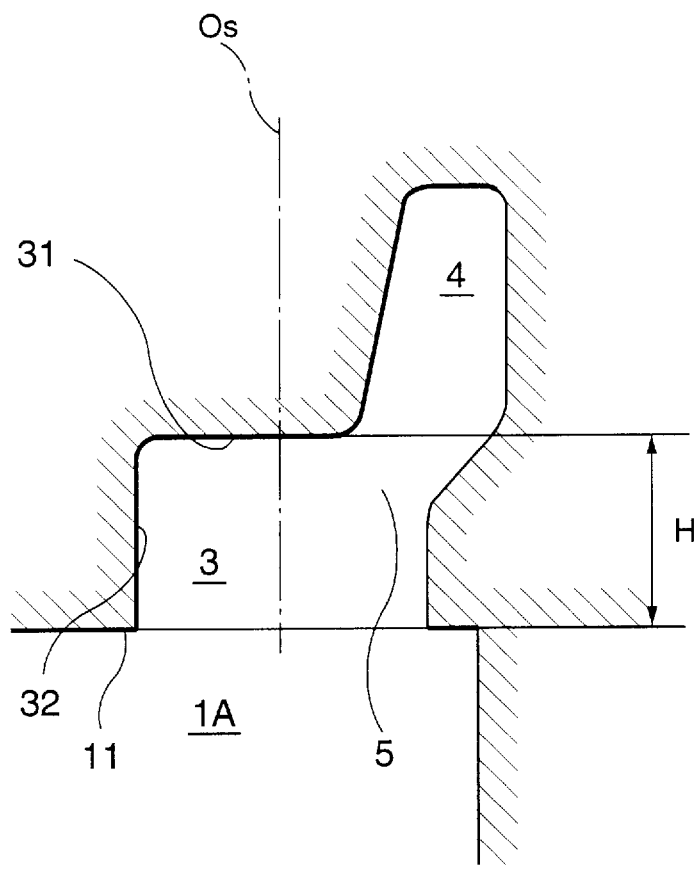
FIG. 2 is a vertical sectional view of the helical intake port.

As shown in FIG. 2, the cylindrical part 3 is a substantially cylindrical aperture parallel to the cylinder 1 in a cylinder head 20, and it is partitioned by a roof 31 and lateral wall 32. A connecting port 5 connecting the cylindrical part 3 and winding part 4 is formed in the roof 31. The connecting port 5 is formed at a height H from the roof 11 of a combustion chamber 1A in the cylinder 1, as shown in FIG. 2. This is equal to the distance between the roof 31 of the cylindrical part 3 and the roof 11 of the combustion chamber 1A, i.e. the vertical length of the cylindrical part 3.

The connecting port 5 has a crescent like plan form and one of its ends coincides with a point 6 shown in FIG. 1A at which the winding part 4 and the cylindrical part 3 begin to overlap in a vertical direction. The both ends of the connecting port 5 subtend an angle $\gamma$ at a center Os of the cylindrical part 3 as shown in FIG. 1A.

An intake valve, not shown, is disposed in the cylindrical part 3 such that it is coaxial with the center line Os shown in FIG. 2.

Next, the method of setting the height H of the connecting port 5 will be described.

First, let the angular width of the connecting port 5 centered on the center line Os in one plane be $\gamma$.

Next, an angle C·$\gamma$, obtained by multiplying the angle $\gamma$ by a coefficient C, is specified, where $0.25 \leq C \leq 0.45$.

Imagine a line N which is rotated through the angle C·$\gamma$ in the swirl direction from the line M connecting the start point 6 of the connecting port 5 and the center Os of the cylindrical part 3, as shown in FIG. 1A. This line N represents the flowrate gravity center position of the connecting port 5.

The line P connecting the center Os with the cylinder center Oc represents the optimum inflow position of the aspirated air through the connecting port 5 so as to form an optimum swirl.

The angle between the line N and the line P is set to $\alpha$. This angle $\alpha$ therefore corresponds to the angle subtended by the flowrate gravity center position and the optimum inflow position at the center Os of the cylindrical part 3.

Let the cross-sectional area of the boundary area of the straight part 2 and winding part 4 shown in FIG. 1A, be A. The boundary area corresponds to the part of the straight part 2 having the minimum cross-section.

Figure 4:
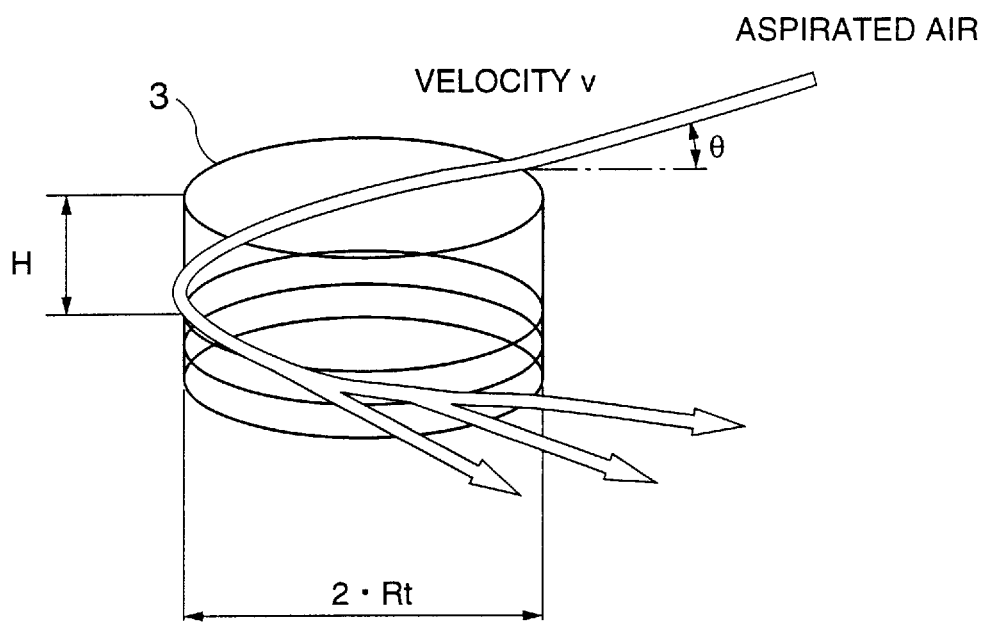
FIG. 4 is a perspective view of the swirl set up by the helical intake port.

The height H of the connecting port 5 is determined by the following equation (1) using a descending angle $\theta$ of the swirl in the winding part 4 as shown in FIG. 4, a radius At of the cylindrical part 3, and the angle $\alpha$.

$$H = Rt \cdot \alpha \cdot \tan\theta \tag{1}$$

Figure 3:
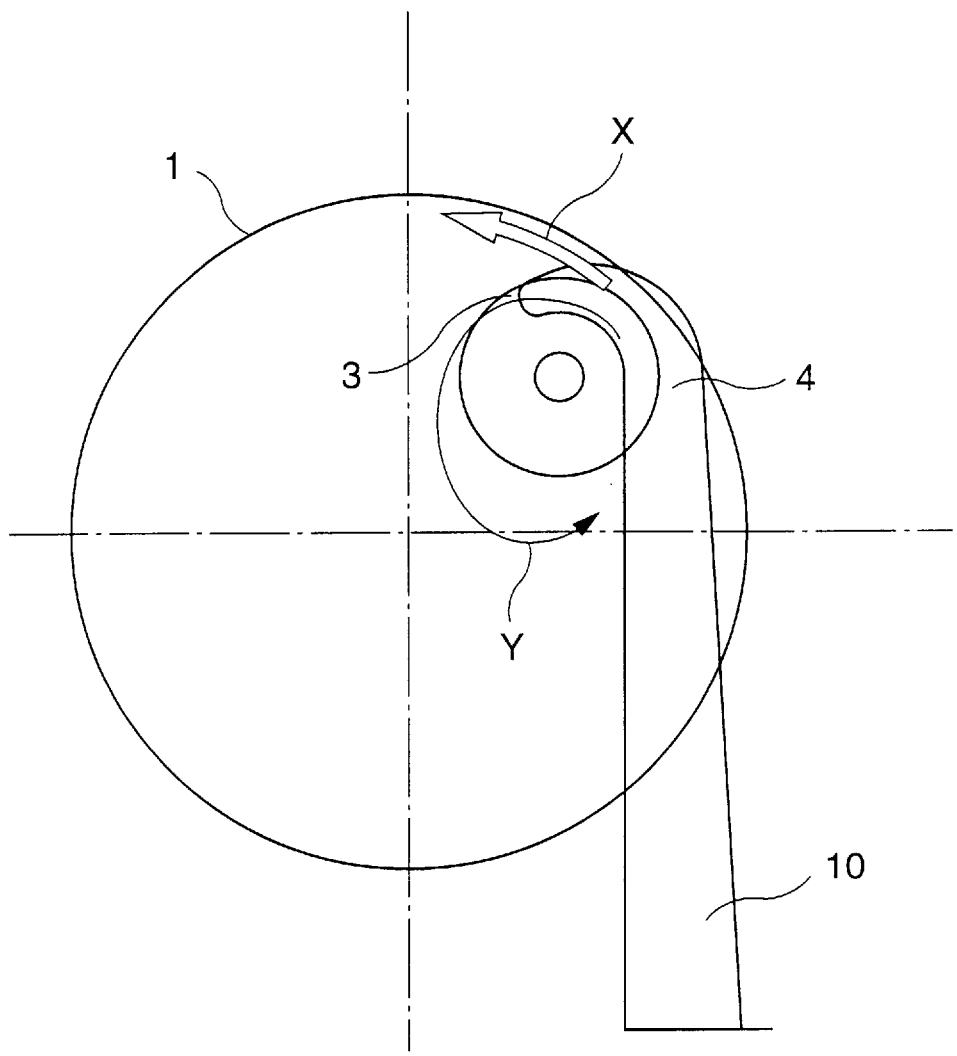
FIG. 3 is a plan view of the helical intake port showing the appearance of a swirl set up by the helical intake port.
Figure 8:
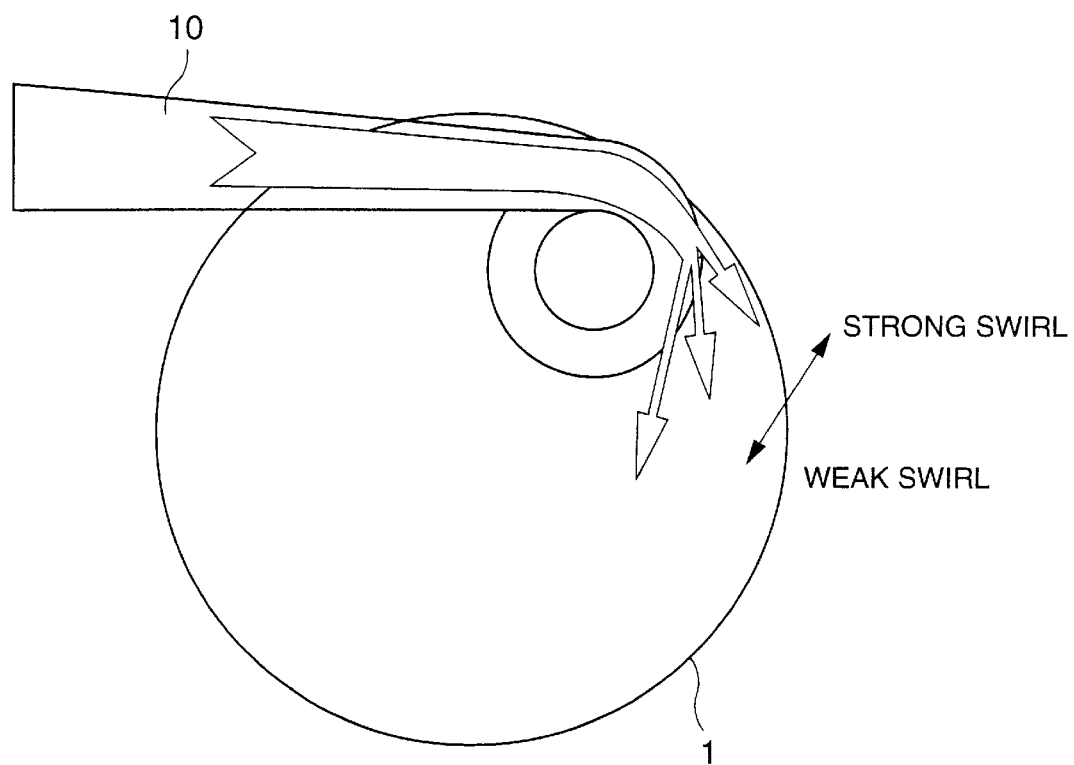
FIG. 8 is a schematic plan view of the helical intake port describing the effect of the vertical length of the cylindrical part on the formation of swirl.

The roof plane of the winding part 4 is formed on an inclined plane which substantially coincides with the descending angle $\theta$ of the swirl. The descending angle $\theta$ of the swirl is expressed by the following equation (2):

$$\theta = \cos^{-1}\left(\frac{Sr \cdot A}{St \cdot B}\right) \tag{2}$$

where,
Sr=swirl ratio required by the engine performance
B=diameter of cylinder
St=stroke distance of piston Herein, the swirl ratio Sr is a value obtained in a steady flow test during full lift of the intake valve measured by an impulse swirl meter, and is defined by the following equation (3):

$$Sr = \frac{2 \cdot \omega \cdot St \cdot \rho}{Q \cdot Q} \tag{3}$$

where,
$\omega$=angular momentum of the swirl in unit time measured by the impulse swirl meter
$\rho$=air density
Q=air mass flowrate during test In FIG. 3, the arrow X shows swirl taking place along the walls of the cylinder 1, and the arrow Y shows swirl not taking place along these walls. The angular momentum maintained when air is flowing from the cylindrical part 3 to the cylinder 1 is greater for swirl X than for swirl Y, and X sets up a strong swirl in the combustion chamber 1A. To set up a strong swirl, it is therefore effective to guide the air flow along the walls of the cylinder 1 from the cylindrical part 3 as in FIG. 8.

Air which has flowed through the straight part 2, flows through the winding part 4, swirls around the walls of the cylindrical part 3 and then enters the cylinder 1. In this case, the direction of the air aspirated into the cylinder 1 depends on the descending angle $\theta$ of the swirl as shown in FIG. 4. The dimensions which give the maximum swirl effect are therefore given by the following relations.

Assuming that all the aspirated air flows along the walls of the cylinder 1 at a velocity v, the angular momentum U of aspirated air per unit time is expressed by the following equation (4):

$$U = Q \cdot v \cdot \frac{B}{2} \cdot \cos\theta \tag{4}$$

The flow velocity v of the aspirated air is expressed by the following equation (5) as a flowrate through the straight part 2:

$$v = \frac{Q}{\rho \cdot A} \tag{5}$$

The angular momentum U is therefore given by the following equation (6):

$$U = Q \cdot Q \cdot B \cdot \left(\frac{\cos\theta}{2 \cdot \rho \cdot A}\right) \tag{6}$$

The swirl ratio Sr is given by the following equation (7):

$$Sr = St \cdot B \cdot \frac{\cos\theta}{A} \tag{7}$$

The descending angle $\theta$ of the aspirated air is therefore expressed by the above equation (2).

A swirl distance L of the spiral flow in the cylindrical part 3 is given by the following equation (9):

$$L = \frac{H}{\tan\theta} \tag{9}$$

The swirl distance L to generate an effective swirl is estimated as follows.

Figure 5:
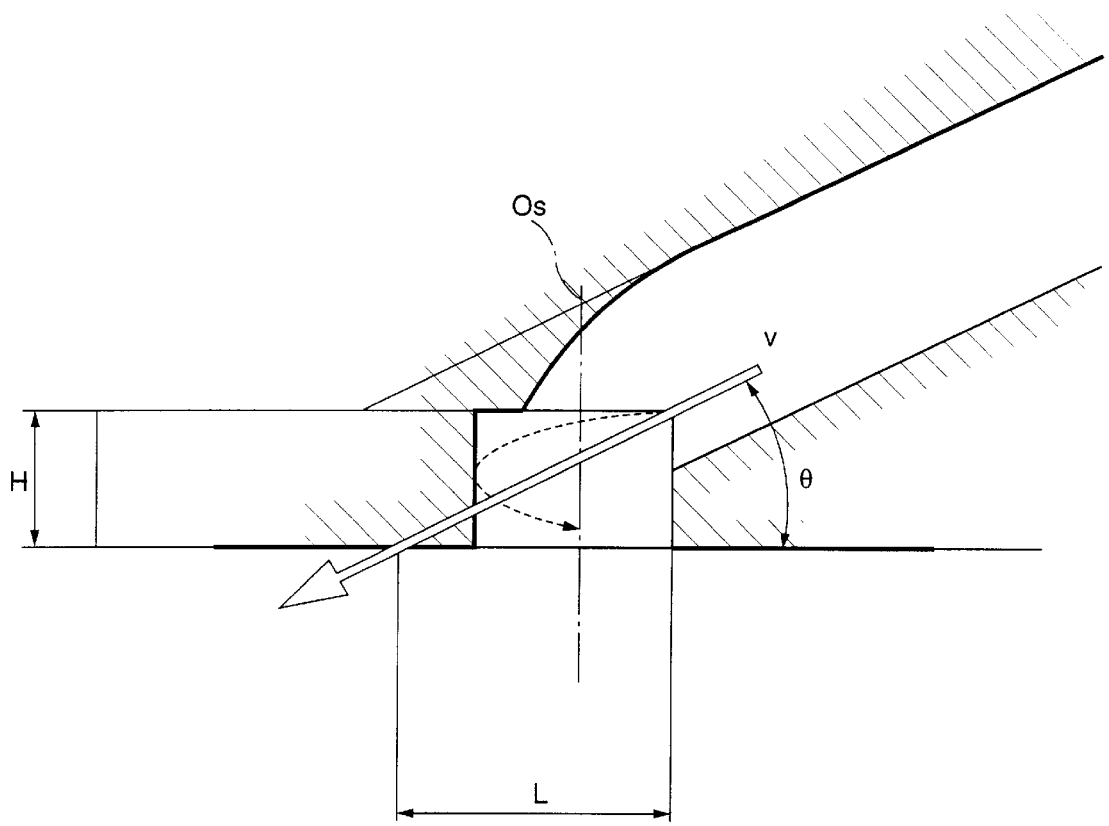
FIG. 5 is a vertical sectional view of the helical intake port.

Start points for the swirl flow in FIG. 4, FIG. 5 extend throughout the whole of the connecting port 5. The gravity center of the aspirated air flowing into the combustion chamber 1A from the connecting port 5 is arranged to coincide with the position at which the flow along the walls of the cylinder 1 is intensified.

Figure 6:
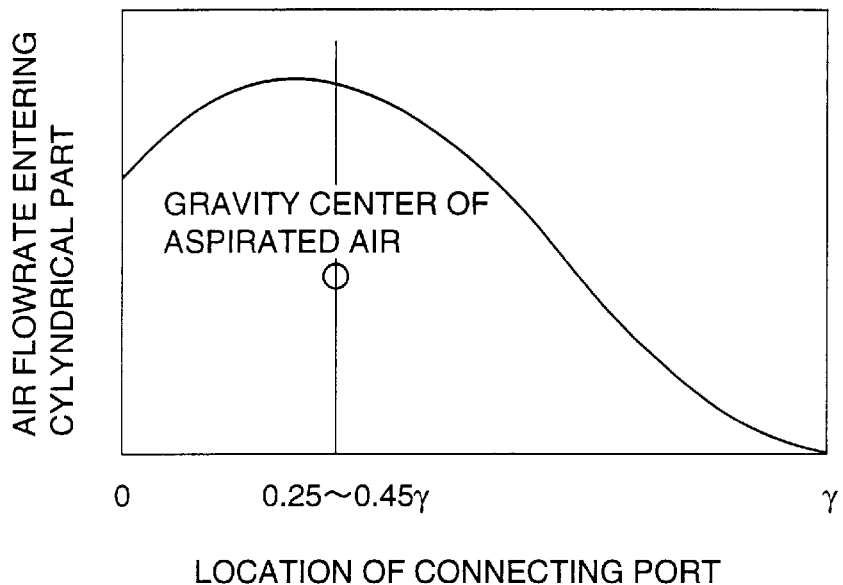
FIG. 6 is a graph showing a relation between the position of a connecting port and a flowrate of air entering the cylindrical part, according to this invention.
Figure 7:
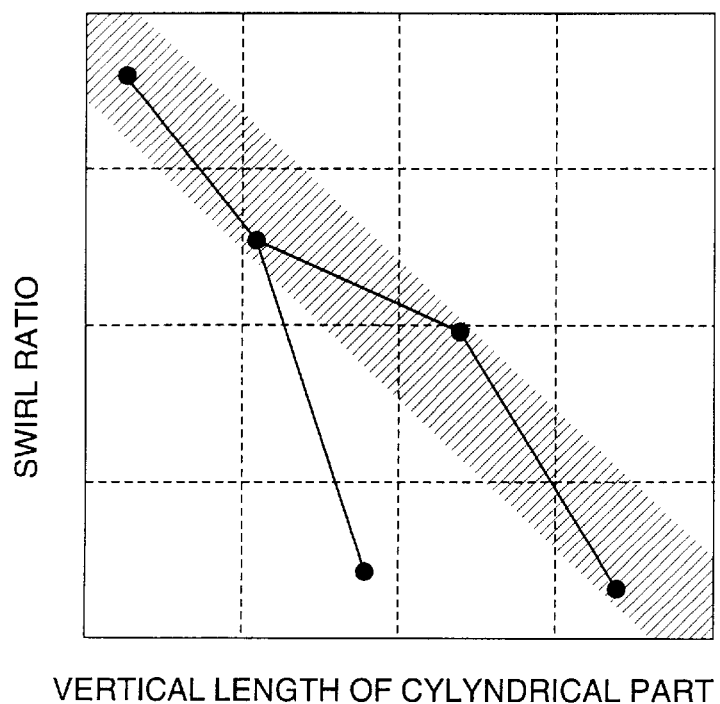
FIG. 7 is a graph showing a relation between the vertical length of the cylindrical part and a swirl ratio, according to this invention.

From experimental and numerical analysis, this is normally given by a position which is 0.25–0.45 times the angular width $\gamma$ of the connecting port 5 as shown in FIG. 6.

On the other hand, the inflow position at which angular momentum is maximized is on the line P connecting the cylinder center Oc and the center Os of the cylindrical part 3 shown in FIG. 1A.

When the angle subtended by the gravity center position of the air flowing into the combustion chamber 1A and the inflow position at which angular momentum is maximized at the cylindrical center Os is $\alpha$, the swirl distance L is given by the following expression:

$$L = Rt \cdot \alpha \tag{10}$$

Therefore the height of the connecting port 5 is expressed by the above equation (1).

In equation (1), there are errors in that all angular momentum of the aspirated air is expressed by flow along the walls of the cylinder 1, or that the flow from the connecting port 5 is expressed by the gravity center position of the inflowing air. These errors tend to cause the swirl to be calculated higher than it is in practice.

Also the inflow velocity v was represented by the velocity in the straight part 2, however in practice the inflow velocity v is greater than the given value due to compression flow in the connecting port 5.

These two error factors cancel each other out, and consequently, the dimensional setting of the intake port 10 using equation (1) can be performed with sufficiently high precision.

By setting the descending angle $\theta$ of the swirl flow of aspirated air to effectively coincide with the descending angle of the roof of the winding part 4, air aspirated from the winding part 4 to the cylindrical part 3 is made to flow in smoothly, and the flowrate coefficient of the intake port 10 is improved.

Hence as described hereabove, by efficiently causing the air aspirated from the cylindrical part 3 into the cylinder to swirl, both an intense swirl having a swirl ratio higher than 6 and a desirable volume efficiency are achieved.

I claim:

1. A helical intake port through which air flows into a combustion chamber of a diesel engine, comprising:

a cylindrical part having an opening at an upper end of said combustion chamber, a winding part having a spiral shape connected to said cylindrical part via a connecting part formed in an upper end of said cylindrical part, and a straight part connected to an upstream end of said winding part for guiding air to said winding part in a linear stream, wherein a height H from said opening to said connecting part is defined by the following equation:

$$H = Rt \cdot \alpha \cdot \tan \theta$$

where,

Rt=radius of cylindrical part, $\alpha$=angle subtended by flowrate gravity center position and optimum inflow position of connecting port at center of cylindrical part, and $\theta$=descending angle of aspirated air in winding part.

2. A helical intake port as defined in claim 1, wherein said angle $\alpha$ is an angle between a line taken at an angle C·$\gamma$ in a swirl direction relative to a line connecting a start point of said connecting port and the center of said cylindrical part, and a line connecting the center of said cylindrical part and the center of a cylinder, said angle $\gamma$ is a spread angle $\gamma$ relating to a length of said connecting port and C is a coefficient lying in the range: $0.25 \leq C \leq 0.45$.

3. A helical intake port as defined in claim 1, wherein a descending angle of a roof plane of said winding part is made to effectively coincide with a descending angle $\theta$ of the aspirated air obtained by the following equation:

$$\theta = \cos^{-1}\left(\frac{Sr \cdot A}{St \cdot B}\right)$$

where,

Sr=target swirl ratio,

A=cross-sectional area of part connecting said straight part and winding part,

St=stroke distance of piston which expands and compresses combustion chamber, and B=diameter of cylinder.

* * * * *